US012654526B2

(12) United States Patent (10) Patent No.: US 12,654,526 B2
Yamaki et al. (45) Date of Patent: Jun. 16, 2026

(54) WEATHER STRIP

(71) Applicant: NISHIKAWA RUBBER CO., LTD.,
Hiroshima (JP)

(72) Inventors: Takahiro Yamaki, Hiroshima (JP);
Kazuyuki Yamanaka, Hiroshima (JP)

(73) Assignee: NISHIKAWA RUBBER CO., LTD.,
Hiroshima (JP)

( * ) Notice: Subject to any disclaimer, the term of this
patent is extended or adjusted under 35
U.S.C. 154(b) by 0 days.

(21) Appl. No.: 18/979,024

(22) Filed: Dec. 12, 2024

(65) Prior Publication Data

US 2025/0229616 A1 Jul. 17, 2025

(51) Int. Cl.
B60J 10/30 (2016.01)
B60J 10/24 (2016.01)
B60J 10/86 (2016.01)

(52) U.S. Cl.
CPC .............. B60J 10/86 (2016.02); B60J 10/24
(2016.02); B60J 10/30 (2016.02)

(58) Field of Classification Search
CPC ... B60J 10/36; B60J 10/30; B60J 10/24; B60J
10/86
See application file for complete search history.

(56) References Cited

U.S. PATENT DOCUMENTS

| | | | | |
|---|---|---|---|---|
| 8,215,701 | B1 * | 7/2012 | Mori ........................ | B60J 10/36 |
| | | | | 49/482.1 |
| 9,809,097 | B1 * | 11/2017 | Metcalf ................ | B60J 10/7775 |
| 9,884,541 | B2 * | 2/2018 | Ide ........................... | B60J 10/36 |
| 10,023,036 | B2 * | 7/2018 | Thiele ...................... | B60J 10/25 |
| 2004/0250474 | A1 | 12/2004 | Kubo et al. | |
| 2011/0219701 | A1 * | 9/2011 | Fukuta ..................... | B60J 10/36 |
| | | | | 49/493.1 |
| 2017/0225555 | A1 * | 8/2017 | Takeda ..................... | E06B 3/36 |
| 2021/0284004 | A1 | 9/2021 | Sentani | |

FOREIGN PATENT DOCUMENTS

| | | | |
|---|---|---|---|
| JP | 2001-114036 | | 4/2001 |
| JP | 2001114036 | A * | 4/2001 |
| JP | 2004-291901 | | 10/2004 |
| JP | 2006-82679 | | 3/2006 |
| JP | 3130292 | U | 3/2007 |
| JP | 2009-83639 | | 4/2009 |
| JP | 2016153261 | A * | 8/2016 |
| JP | 2021-142951 | | 9/2021 |

OTHER PUBLICATIONS

JP2001114036 English translation from WIPO (Year: 2001).*
JP2016153261 English translation from WIPO (Year: 2016).*

* cited by examiner

*Primary Examiner* — Muhammad Ijaz
*Assistant Examiner* — Susan M. Heschel
(74) *Attorney, Agent, or Firm* — Casimir Jones, S.C.;
Robert A. Goetz

(57) ABSTRACT

Risk of occurrence of a bonding failure at the time when a
slit hole is bonded is decreased. A weather strip to be
attached to a vehicle has a holding portion having a thin
portion where an insertion hole through which a clip is to be
inserted is formed, and a thick portion that is formed on at
least one of both end sides of the thin portion in the
longitudinal direction of a base portion, which is to be
attached to an attachment part of the vehicle, so as to be
thicker than the thin portion and so as to extend in the
short-side direction of the base portion.

3 Claims, 6 Drawing Sheets

WEATHER STRIP

This Nonprovisional application claims priority under 35 U.S.C. § 119 on Patent Application No. 2024-004073 filed in Japan on Jan. 15, 2024, the entire contents of which are hereby incorporated by reference.

TECHNICAL FIELD

The present invention relates to a weather strip.

BACKGROUND ART

A gap that is formed between a perimeter of an opening formed in a body of a vehicle and a door of the vehicle which closes the opening is sealed by a weather strip. The weather strip is attached to the body or the door of the vehicle, for example, with use of a clip or the like.

In a weather strip disclosed in Patent Literature 1, in a base portion of a die-molded part, a clip insertion hole through which a clip is to be inserted is formed. In the base portion, a slit for removing a molding die for use in molding of a hollow sealing portion is formed so as to detour around the clip insertion hole.

In a weather strip disclosed Patent Literature 2, a die-molded part through hole through which a clip is to be inserted is formed in a die-molded part that is connected to an extrusion-molded part.

CITATION LIST

Patent Literature

[Patent Literature 1]
Japanese Patent Application Publication, Tokukai, No. 2001-114036
[Patent Literature 2]
Japanese Patent Application Publication, Tokukai, No. 2021-142951

SUMMARY OF INVENTION

Technical Problem

In a general-purpose clip used for attaching a weather strip to a body or a door of a vehicle, a distance between a head portion of the general-purpose clip and a locking portion of the general-purpose clip is set to a predetermined distance. Therefore, in a case where such a general-purpose clip is used, a thickness of the weather strip at an insertion portion through which the clip is to be inserted needs to be made thinner than a thickness of the weather strip at the other portion.

In the weather strip of Patent Literature 1, the slit for removing the molding die is closed by bonding opposed edge surfaces of the slit with an adhesive. However, in a case where a portion of the weather strip in the vicinity of the clip insertion hole is formed to be thin, the weather strip has low rigidity and easily bends. For this reason, Patent Literature 1 has a problem in that a failure in bonding of the opposed edge surfaces of the slit easily occurs in the vicinity of the clip insertion hole.

In the weather strip of Patent Literature 2, a thick portion is formed so as to surround a thin portion formed in the vicinity of the die-molded part through hole through which a clip is to be inserted. Therefore, it is possible to increase the rigidity in the vicinity of the die-molded part through hole.

However, the through hole formed in the weather strip of Patent Literature 2 is formed in the die-molded part where no slit hole is formed. The weather strip of Patent Literature 2 is configured in a completely different manner from the weather strip of Patent Literature 1. Therefore, it is difficult to apply a technique of Patent Literature 1 to a technique of Patent Literature 2.

An object of an aspect of the present invention is to reduce the risk of the occurrence of a bonding failure at the time when a slit hole is bonded.

Solution to Problem

In order to solve the above problem, a weather strip in accordance with an embodiment of the present invention is a weather strip to be attached to a vehicle, including: a base portion which is to be attached to an attachment part of the vehicle; and a hollow sealing portion which has a hollow shape and which is integrally formed with the base portion, the base portion being provided with a holding portion that is formed to hold an attaching member for attaching the base portion to the attachment part, and a slit hole that is formed to extend in a longitudinal direction of the base portion, the slit hole being provided with a crank portion that is formed to extend along a short-side direction of the base portion so as to avoid the holding portion, and the holding portion having a thin portion where an insertion hole through which the attaching member is to be inserted is formed, and a thick portion that is formed on at least one of both end sides of the thin portion in the longitudinal direction of the base portion so as to be thicker than the thin portion and so as to extend in the short-side direction of the base portion.

Advantageous Effects of Invention

An aspect of the present invention can reduce the risk of the occurrence of a bonding failure at the time when a slit hole is bonded.

BRIEF DESCRIPTION OF DRAWINGS (a) of FIG. 1 is a perspective view illustrating an appearance of an automotive vehicle to which a weather strip is attached; and (b) of FIG. 1 is a side view schematically illustrating a whole shape of the weather strip attached in a closed-loop form to a peripheral portion of a front door.

FIG. 6 is a cross sectional view taken along line B-B in FIG. 3.

DESCRIPTION OF EMBODIMENTS

Embodiment

<Example of Attachment of Weather Strip>

Figure 1:
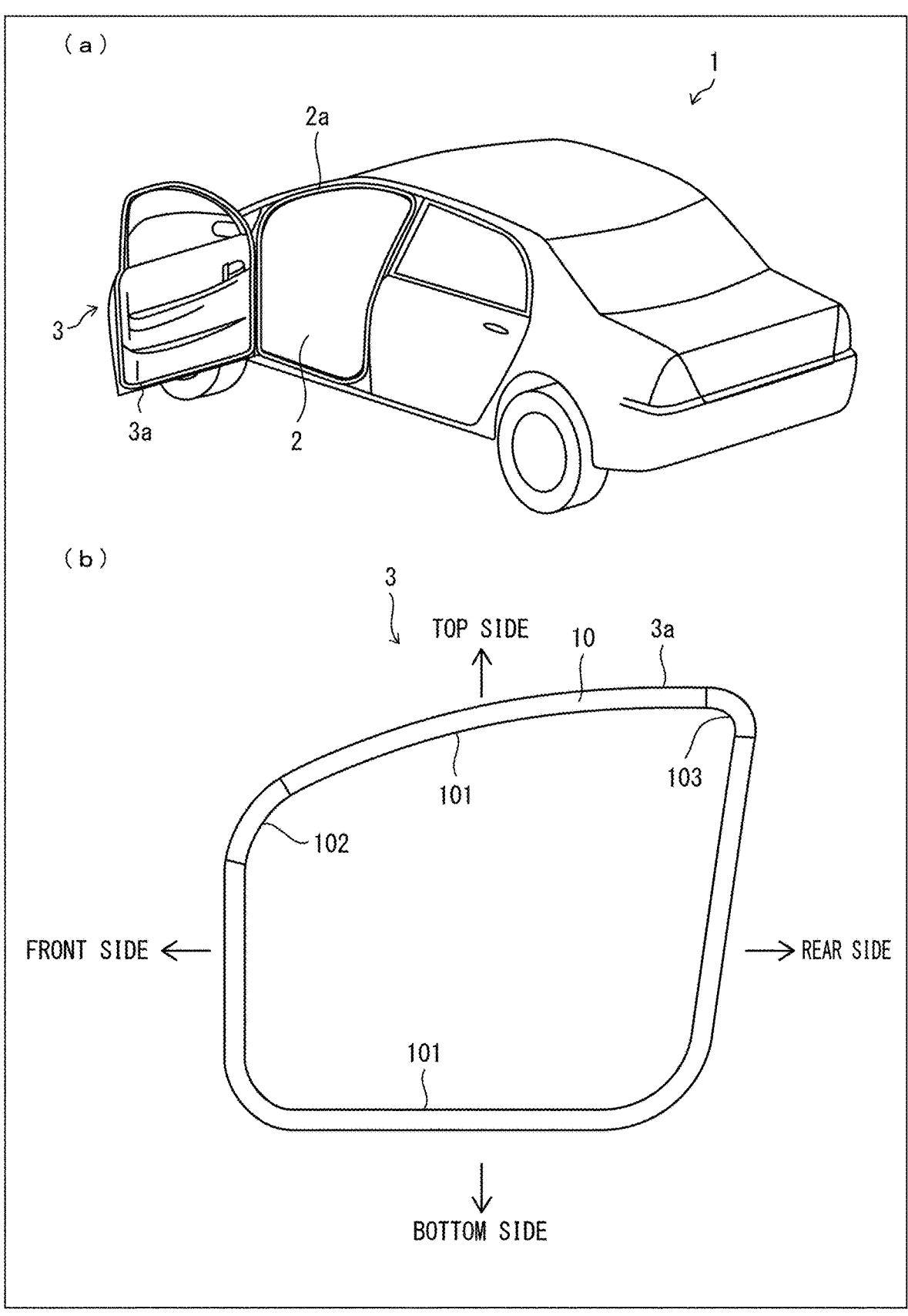

With reference to FIG. 1, the following description will discuss a structure around a door opening 2 in an automotive vehicle 1 to which a weather strip 10 in accordance with an embodiment of the present invention is attached. The automotive vehicle 1 is an example of a vehicle. As illustrated (a) of FIG. 1, the automotive vehicle 1 is provided with a front door 3. Further, in a body of the automotive vehicle 1, the door opening 2 is formed in a position where the front door 3, when closed, is integrated with the body by a hinge (not illustrated). The front door 3 is an automotive part that can be opened/closed for closing the door opening 2.

Further, the weather strip 10 is attached to the door peripheral portion (edge portion) 3a of the front door 3 in a closed-loop form all along the door peripheral portion 3a (see (b) of FIG. 1). The weather strip 10 is an automotive part for sealing a gap between a periphery 2a of the door opening 2 and the door peripheral portion 3a. When the weather strip 10 attached to the door peripheral portion 3a is in elastic contact with the periphery 2a of the door opening 2, the gap between the periphery 2a of the door opening 2 and the door peripheral portion 3a is sealed. Note that the weather strip 10 may be attached to the periphery 2a of the door opening 2.

The weather strip 10 has an extrusion-molded part 101 and die-molded parts 102 and 103. The weather strip 10 need only be formed as a part composed of at least one kind of extrusion-molded part and at least one kind of die-molded part which are integral with each other. The weather strip 10 is formed of a sponge-like rubber. As a material of such rubber, for example, ethylene-propylene-diene rubber (EPDM) can be used. Note however that, as a molding material, the following may be used: thermoplastic elastomer (olefin-based or styrene-based thermoplastic elastomer); other rubber material; or other elastic material having elasticity similar to that of the rubber material. Note that different materials may be used for respective portions of the weather strip 10. Further, the weather strip 10 may be partially or entirely composed of a material in a solid state.

Note that the weather strip 10 is not limited to a part that seals the gap between the periphery 2a of the door opening 2 of the automotive vehicle 1 and the door peripheral portion 3a. The weather strip 10 can be any part that seals a gap between a periphery of an opening formed in a vehicle and a cover which closes the opening. For example, the weather strip 10 may be a part that seals a gap between an engine room and a bonnet.

<Configuration of Main Part of Weather Strip>

Figure 2:
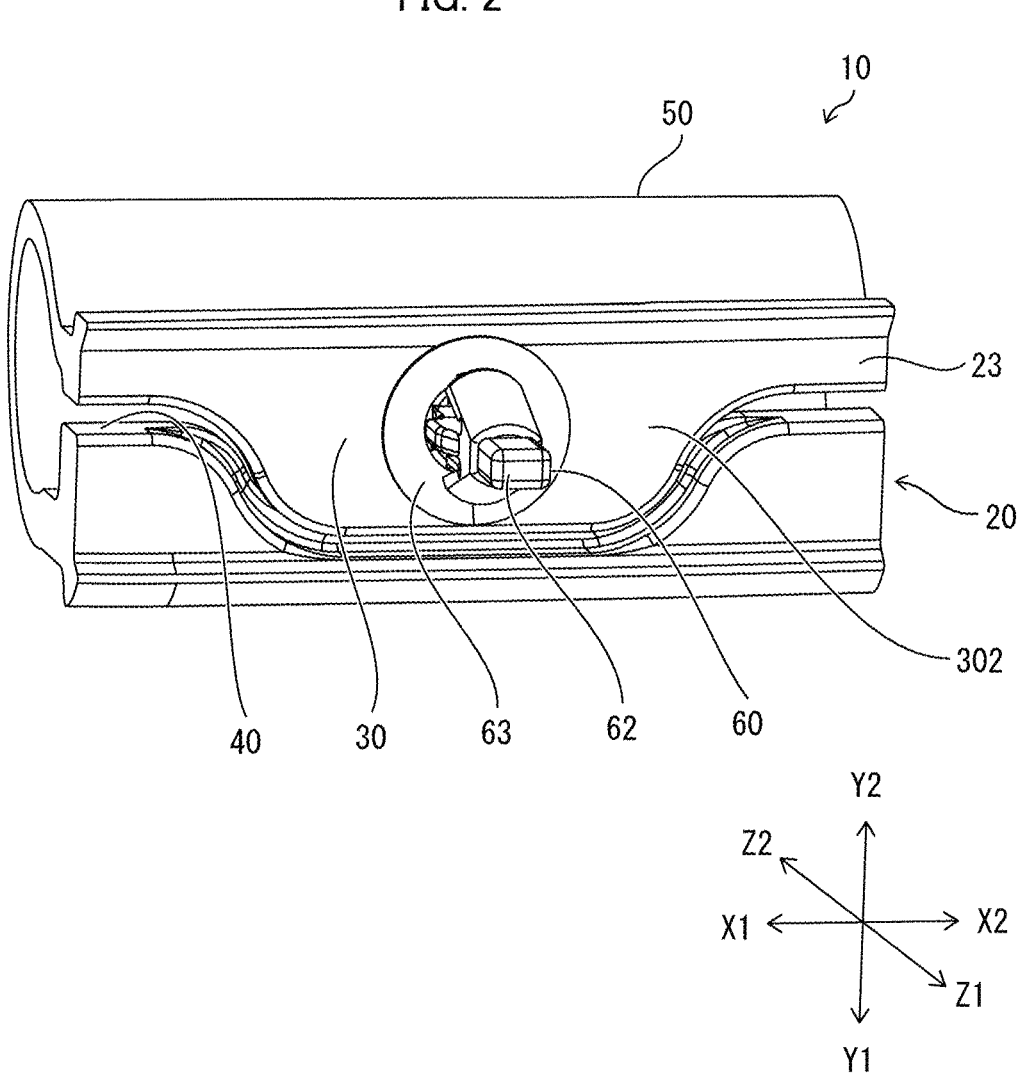
FIG. 2 is a perspective view illustrating a main part of the weather strip in accordance with an embodiment of the present invention.

With reference to FIG. 2, the following description will discuss an overview of a configuration of a main part of the weather strip 10 in accordance with an embodiment of the present invention. Note that in describing the configuration of the main part of the weather strip 10, for convenience of explanation, the following coordinate axes in three directions as shown in FIG. 2 etc. are defined: X (X1-X2) direction; Y (Y1-Y2) direction; and Z (Z1-Z2) direction. The X direction is a longitudinal direction of a base portion 20 of the weather strip 10. The Y direction is a short-side direction of the base portion 20. The Z direction is a thickness direction of the base portion 20. The Y1 direction is a direction from an end 21 side to an end 22 side in the Y direction of the base portion 20. The Y2 direction is a direction from the end 22 side to the end 21 side in the Y direction of the base portion 20. The Z1 direction is a direction from a surface 301 side of the holding portion 30 of the base portion 20 to a surface 302 side of the holding portion 30 opposite to the surface 301. The Z2 direction is a direction from the surface 302 side to the surface 301 side.

As illustrated in FIG. 2, the weather strip 10 includes the base portion 20 and a hollow sealing portion 50. The base portion 20 is attached, by a clip 60, to an attachment part (not illustrated) of the door peripheral portion 3a. The clip 60 is an example of an attaching member for attaching the base portion 20 to the attachment part of the door peripheral portion 3a. The clip 60 is a general-purpose clip for attaching a weather strip to a vehicle. The clip 60 has a head portion 61 (see FIG. 3), a shank portion 62, and a locking portion 63.

In the base portion 20, the following are formed: a base portion body 23; a holding portion 30 for holding the clip 60; and a slit hole 40 that extends in the X direction. The base portion body 23 is a main portion of the base portion 20. The slit hole 40 is a hole for removing each molding die that is used for molding the hollow sealing portion 50 when the die-molded parts 102 and 103 of the weather strip 10 are molded. After the molding die is removed through the slit hole 40, edge surfaces of the slit hole 40 that face each other in the Y direction are bonded to each other. Note that FIG. 2 illustrates the slit hole 40 in a non-bonded state. Detailed configurations of the holding portion 30 and the slit hole 40 will be described later. Note here that in the present specification, "to bond opposed edge surfaces of a slit (slit hole)" is also expressed as "to bond a slit (slit hole)".

The hollow sealing portion 50 has a hollow shape and is integrally formed with the base portion 20. The hollow sealing portion 50 is a portion that is in elastic contact with the periphery 2a of the door opening 2 in a process of closing the door.

With reference to FIGS. 3 to 6, the following description will discuss detailed configurations of the holding portion 30 and the slit hole 40 of the weather strip 10 in accordance with an embodiment of the present invention. Note that in FIGS. 3 and 4, the hollow sealing portion 50 is not illustrated in consideration of easy understanding of the drawings. Portions indicated by hatched lines in FIGS. 3 and 4 correspond to root portions of the hollow sealing portion 50 where the hollow sealing portion 50 is connected to the base portion 20. Further, in FIGS. 3 to 6, the slit hole 40 in the non-bonded state is illustrated.

Figure 3:
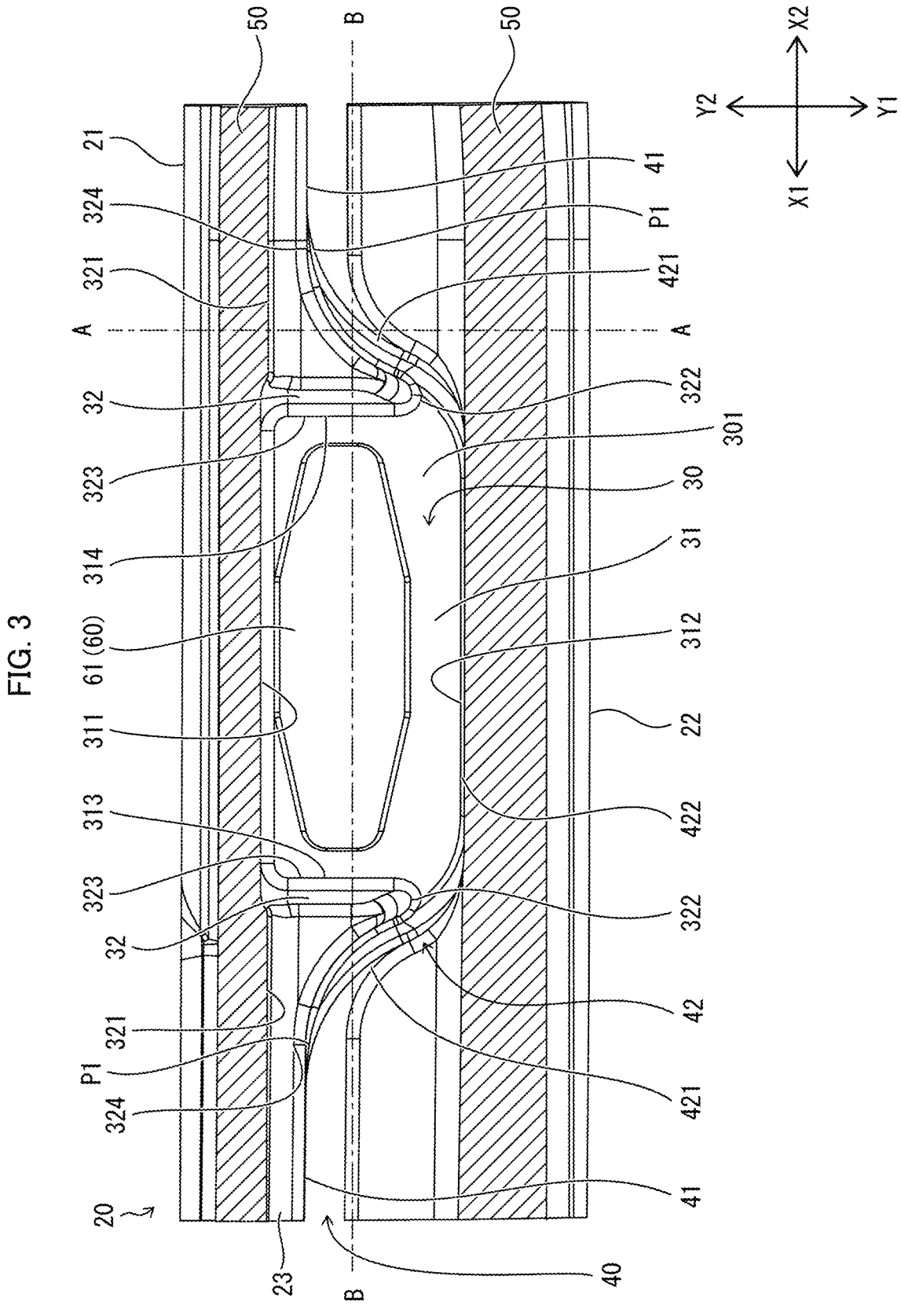
FIG. 3 is a plan view illustrating a base portion of the weather strip in a state in which a clip is attached.

As illustrated in FIG. 3, the holding portion 30 is formed so as to protrude from the end 21 side on a Y2 side of the base portion 20 to the end 22 side of the base portion 20 on a Y1 side. The holding portion 30 has a substantially trapezoidal shape when viewed in the Z direction. The holding portion 30 is connected, on the Y2 side, to the root portion of the hollow sealing portion 50 located on the Y2 side. In the holding portion 30, a thin portion 31 and a thick portion 32 are formed.

Figure 4:
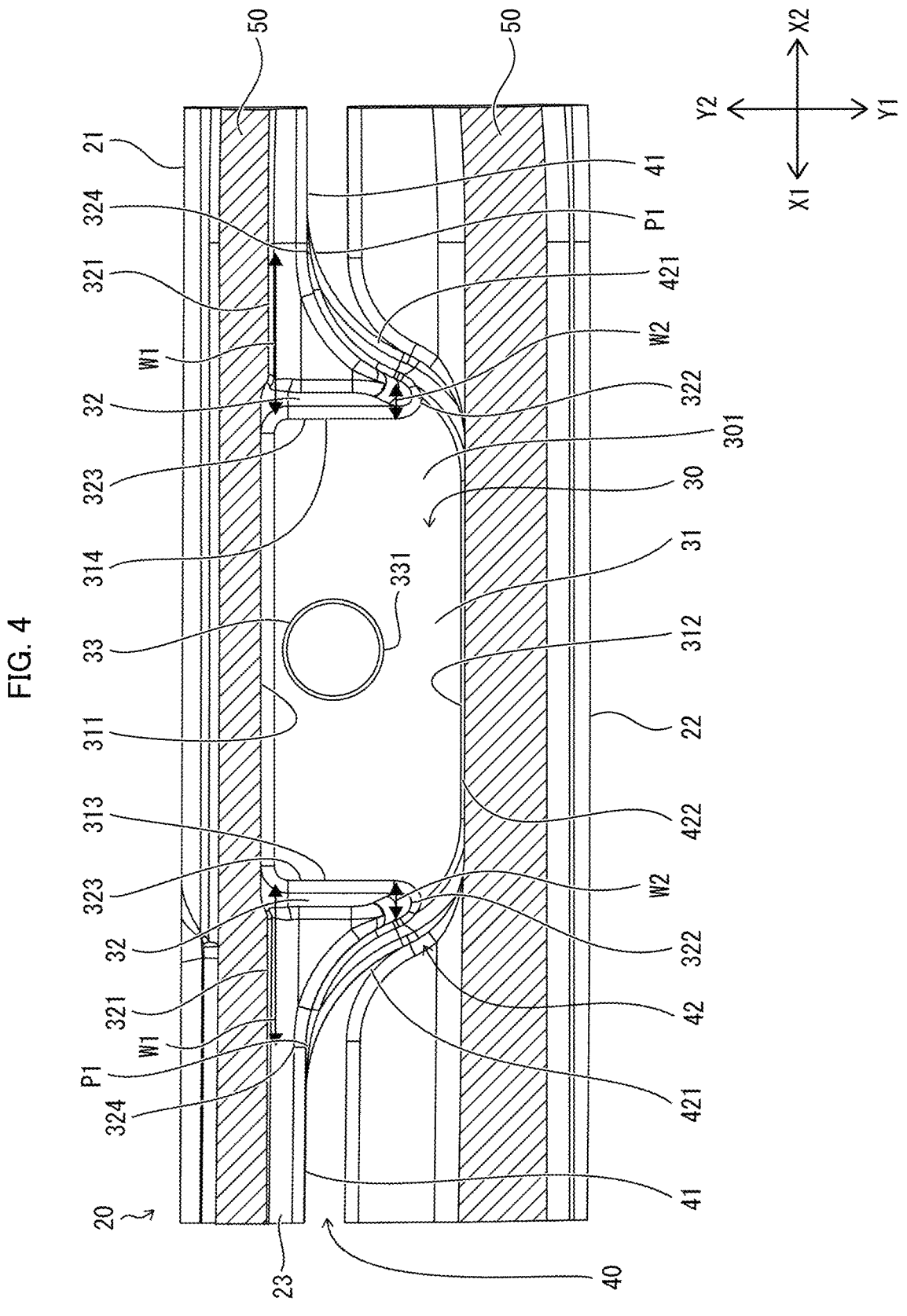
FIG. 4 is a plan view illustrating the base portion of the weather strip in a state in which the clip is detached.

As illustrated in FIG. 4, in the thin portion 31, an insertion hole 33 through which the clip 60 is to be inserted is formed. The insertion hole 33 is formed at a substantially central portion of the thin portion 31 in the X direction. By inserting the clip 60 into the insertion hole 33, the clip 60 is held by the holding portion 30. An end 311 of the thin portion 31 on the Y2 side is connected to the root portion of the hollow sealing portion 50. An end 312 of the thin portion 31 on the Y1 side constitutes a straight portion 422 of the slit hole 40.

Figure 6:
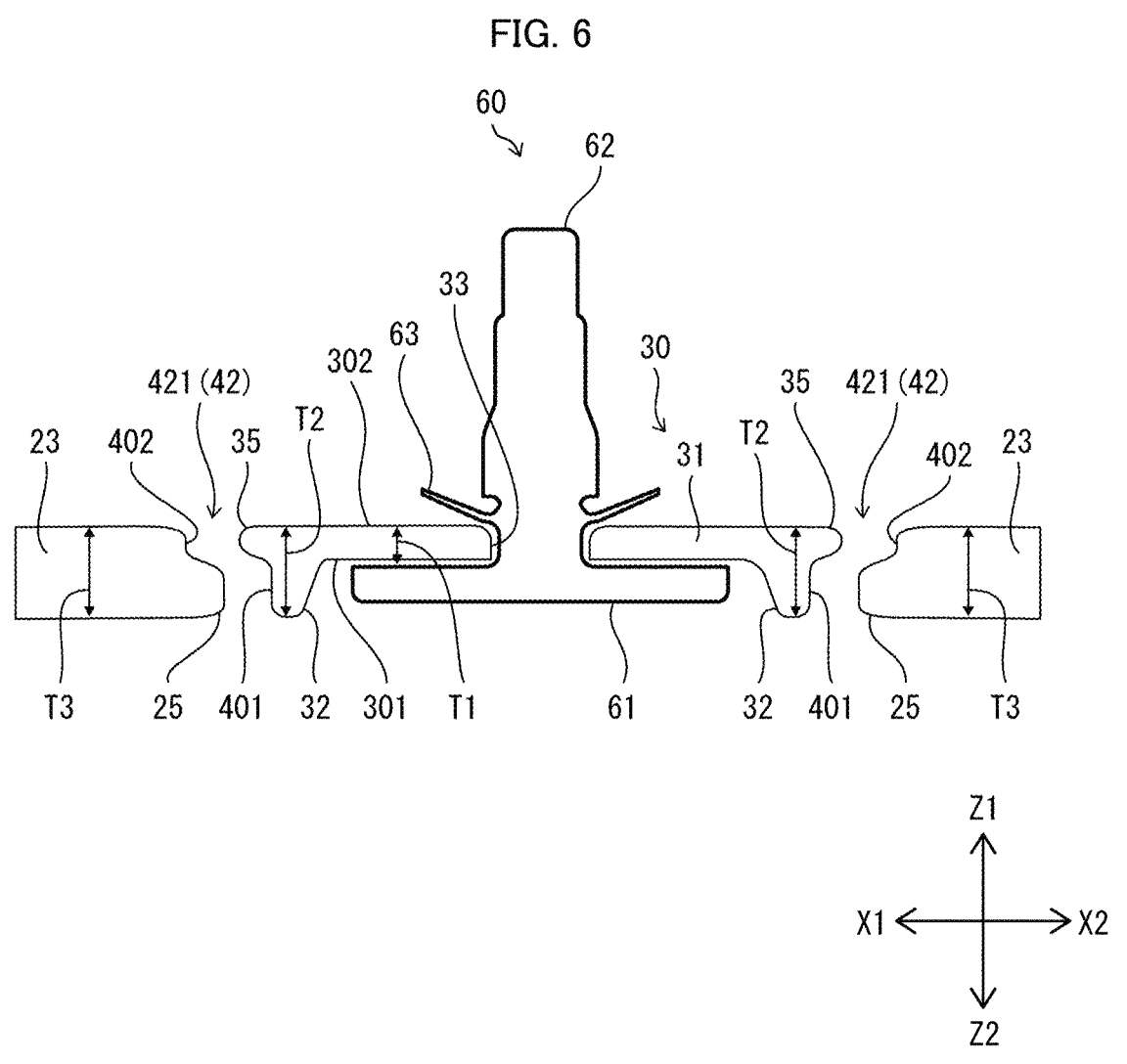

As illustrated in FIGS. 3 and 4, a plurality of the thick portions 32 are formed in the holding portion 30, and the thick portions 32 are formed on both of an end 313 side and an end 314 side of the thin portion 31 in the X direction, respectively. As illustrated in FIG. 6, the thick portion 32 is formed in the holding portion 30 so as to protrude toward a Z2 side.

More particularly, as illustrated in FIG. 3, the thick portion 32 located on an X1 side of the thin portion 31 is connected to an end 313 on the X1 side of the thin portion 31. Meanwhile, the thick portion 32 located on an X2 side of the thin portion 31 is connected to an end 314 on the X2 side of the thin portion 31. The end 313 of the thin portion 31 and the end 323 of the thick portion 32 that is located on the X1 side are at the same position in the X direction. Further, the end 314 of the thin portion 31 and the end 323 of the thick portion 32 that is located on the X2 side are at the same position in the X direction.

The thick portion 32 is formed adjacent to a crank portion 421 of the slit hole 40. The crank portion 421 extends along the Y direction so as to avoid the holding portion 30. In the X direction, an end 324 of the thick portion 32 which is located at a position farthest from the insertion hole 33 is located at the same position as a starting point P1 where the crank portion 421 starts to curve in the Y1 direction from a straight portion 41. That is, in the X direction, the thick portion 32 is formed in a region where the thin portion 31 of the holding portion 30 is not formed.

Note that the thick portion 32 is not necessarily configured such that a plurality of thick portions are formed in the holding portion 30 and the thick portion 32 may be formed only on the X1 side of the thin portion 31 in the X direction or only on the X2 side of the thin portion 31 in the X direction. Further, the thick portion 32 is not limited to a thick portion(s) that is/are formed at the end(s) 313 and/or 314 of the thin portion 31 in the X direction. For example, the thick portion 32 may be formed so as to be located between the end 313 of the thin portion 31 and the insertion hole 33 in the X direction or between the end 314 of the thin portion 31 and the insertion hole 33 in the X direction. In other words, the thin portion 31 may be formed so as to surround the thick portion 32 that extends from the root portion of the hollow sealing portion 50. In this case, the end 313 of the thin portion 31 is located on the X1 side of the end 324 of the thick portion 32 on the X1 side, and the end 314 of the thin portion 31 is located on the X2 side of the end 324 of the thick portion 32 on the X2 side.

As illustrated in FIG. 3, the thick portion 32 is formed at a position where the thick portion 32 does not interfere with the head portion 61 of the clip 60 that is held in the thin portion 31. In other words, the end 323 on the X2 side of the thick portion 32 located on the X1 side of the thin portion 31 and the end 323 on the X1 side of the thick portion 32 located on the X2 side of the thin portion 31 are located at positions where the ends 323 on the X1 and X2 sides do not overlap with the head portion 61 of the clip 60 held by the holding portion 30 when viewed in the Z direction.

As illustrated in FIGS. 3 and 4, the thick portion 32 extends in the Y direction. More particularly, the thick portion 32 extends in the Y1 direction from a base end 321 of the thick portion 32 where the thick portion 32 is connected to the root portion of the hollow sealing portion 50. The thick portion 32 is configured like a rib. In the Y direction, a tip portion 322 of the thick portion 32 may be located on the Y1 side of an end 331 of the insertion hole 33 that is a farthest end of the insertion hole 33 on the Y1 side. In the Y direction, the tip portion 322 is an end which is a farthest end of the thick portion 32 on the Y1 side. Note that in the Y direction, the tip portion 322 may be located on the Y2 side of the end 331 of the insertion hole 33.

Further, the thick portion 32 is located between the insertion hole 33 and the crank portion 421 of the slit hole 40 in the X direction. The thick portion 32 extends from the end 313, 314 of the thin portion 31 in a direction away from the insertion hole 33. Specifically, the thick portion 32 located on the X1 side of the thin portion 31 extends from the end 313 in the X1 direction. The thick portion 32 located on the X2 side of the thin portion 31 extends from the end 314 in the X2 direction. A surface of the thick portion 32 that constitutes the slit hole 40 and that connects the end 324 and the tip portion 322 forms a part of the crank portion 421 and is curved so as to correspond to a shape of the crank portion 421.

As illustrated in FIG. 4, a width W1 of the base end 321 is wider than a width W2 of the tip portion 322. Here, in the present specification, the width of the thick portion 32 means a width in the X direction. More particularly, the width of the thick portion 32 gradually increases from the Y1 side to the Y2 side. Note that the width of the thick portion 32 is not limited to such a configuration. The thick portion 32 may be configured like, for example, an L-shape such that only the width W1 of the base end 321 is wide and the width of the other portion is the same as the width W2 of the tip portion 322. Alternatively, the thick portion 32 may be configured to extend only in the Y direction, and may not be configured to extend in the direction away from the insertion hole 33. In other words, the thick portion 32 may be configured such that the width W1 of the base end 321 and the width W2 of the tip portion 322 are equal to each other. For example, the thick portion 32 may have, like an I shape, a substantially constant width in the Y direction.

As illustrated in FIG. 6, a thickness T2 of the thick portion 32 in the Z direction is thicker than a thickness T1 of the thin portion 31 in the Z direction. The thickness T1 is formed so as to be thinner (smaller) than a distance between the head portion 61 and the locking portion 63 of the clip 60 in the Z direction. The thickness T2 of the thick portion 32 is the same as a thickness T3 of the base portion body 23 in the Z direction. The thickness T1 is, for example, 2 mm, and the thickness T2 is, for example, 4 mm. Note that the thickness T2 may be thinner than the thickness T3 or may be thicker than the thickness T3. Further, the thickness of the thick portion 32 in the Z direction on the X1 side may be different from the thickness of the thick portion 32 in the Z direction on the X2 side.

Figure 5:
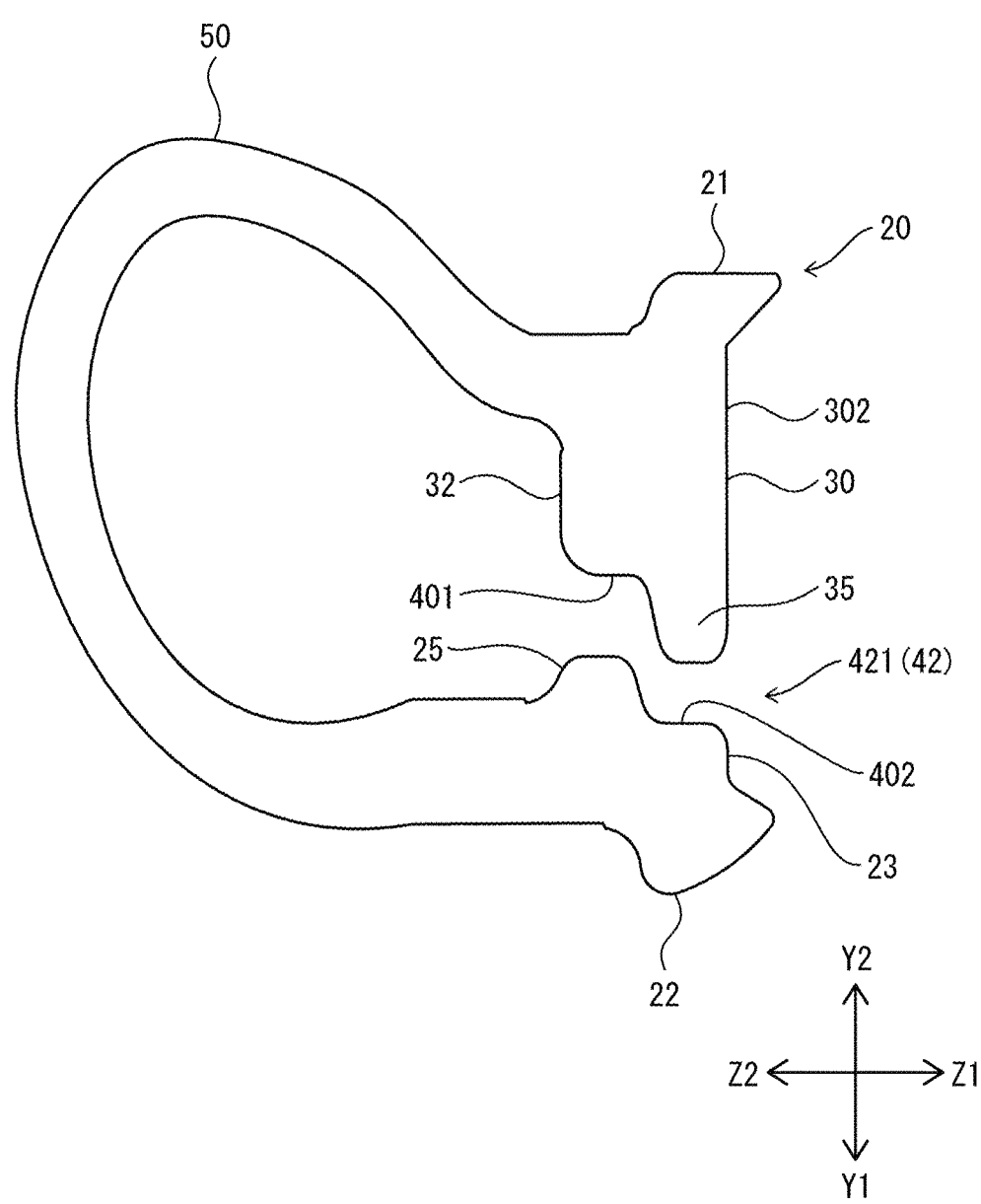
FIG. 5 is a cross sectional view taken along line A-A in FIG. 3.

As illustrated in FIGS. 4 and 5, the thick portion 32 is formed on the surface 301 of the holding portion 30 which is on the same Z2 side in the Z direction as the surface where the hollow sealing portion 50 of the base portion 20 is formed. Accordingly, in the Z direction, no step that is produced due to thickness difference between the thick portion 32 and the thin portion 31 is formed on the surface 302 of the holding portion 30 on the Z1 side which is located opposite to the surface where the hollow sealing portion 50 of the base portion 20 is formed. In other words, the surface 302 can be a flat surface. This makes it possible to easily attach the clip 60 to the holding portion 30. Further, since the surface 302 is a flat surface, it is also possible to easily attach the weather strip 10 to the attachment part of the door peripheral portion 3a. Note that the thick portion 32 may be formed on a surface opposite to the surface where the hollow sealing portion 50 of the base portion 20 is formed.

As described above, since the thick portion 32 is formed in the holding portion 30, the rigidity of the holding portion 30 can be increased. Thus, the holding portion 30 less easily bends. This makes it possible to reduce the risk of the occurrence of a bonding failure at the time when the slit hole 40 is bonded. A configuration in which the thick portion 32 is formed in the holding portion 30 is more effective for a weather strip 10 in which the slit hole 40 that is likely to result in the bonding failure is formed. Examples of such a slit hole 40 include: (i) a slit hole 40 which is formed in a die-molded part 103 (see FIG. 1) having a larger curvature; and (ii) a slit hole 40 which is long in the X direction. Further, since the thick portion 32 extends in the Y direction, the holding portion 30 less easily bends in the Y direction. This also makes it possible to prevent the slit hole 40 from being displaced in the Y direction at the time when the slit hole 40 is bonded.

Further, the thick portion 32 extends not only in the Y direction but also in the X direction. This can make it difficult for the holding portion 30 to bend. This makes it possible to further reduce the risk of the occurrence of a bonding failure at the time when the slit hole 40 is bonded.

In addition, since the width of the thick portion 32 gradually increases from the Y1 side to the Y2 side, an area ratio of the thick portion 32 to the holding portion 30 can be increased. Therefore, it is possible to further increase the rigidity of the holding portion 30. This makes it possible to further reduce the risk of the occurrence of a bonding failure at the time when the slit hole 40 is bonded.

As illustrated in FIGS. 3 and 4, in the slit hole 40, the straight portion 41 and a detour portion 42 are formed. The straight portion 41 is a straight portion that extends in the X direction. The detour portion 42 is a portion formed to detour around the holding portion 30. In the detour portion 42, the crank portion 421 and the straight portion 422 are formed.

The crank portion 421 extends along the Y direction so as to avoid the holding portion 30. More particularly, the crank portion 421 is curved from the straight portion 41, from the end 21 side of the base portion 20 on the Y2 side to the end 22 side of the base portion 20 on the Y1 side. The crank portion 421 is curved in the Y1 direction such that an angle made between the crank portion 421 and the straight portion 41 is an obtuse angle. Note that the crank portion 421 may be curved in the Y1 direction such that the angle made between the crank portion 421 and the straight portion 41 is a substantially right angle. Further, the crank portion 421 may be configured so as to bend in the Y1 direction from the straight portion 41.

The straight portion 422 is a straight portion that extends in the X direction. The straight portion 422 connects a Y1-side end of the crank portion 421 that is located on the X1 side of the holding portion 30 and a Y1-side end of the crank portion 421 that is located on the X2 side of the holding portion 30. The straight portion 422 is a portion along the end 312 of the thin portion 31. Note that in the detour portion 42, the straight portion 422 may not be formed. For example, the Y1-side end of the crank portion 421 located on the X1 side may be connected to the Y1-side end of the crank portion 421 located on the X2 side.

As illustrated in FIG. 5, a first protrusion 35 and a second protrusion 25 are formed on a first surface 401 and a second surface 402, respectively, which are surfaces of the base portion 20 that form the slit hole 40. The first surface 401 is a surface that is located on a holding portion 30 side. The second surface 402 is a surface that faces the first surface 401. The first surface 401 and the second surface 402 are surfaces whose longitudinal direction is the X direction.

The first protrusion 35 protrudes from the first surface 401 toward the second surface 402, and the second protrusion 25 protrudes from the second surface 402 toward the first surface 401. The first protrusion 35 and the second protrusion 25 are formed in a stepped manner in the Z direction.

The second protrusion 25 is located closer in the Z direction to the surface where the hollow sealing portion 50 is formed than the first protrusion 35. That is, the second protrusion 25 is located on the Z2 side of the first protrusion 35 in the Z direction.

The first protrusion 35 and the second protrusion 25 are formed in portions that correspond to the detour portion 42 and that are of the first surface 401 and the second surface 402, respectively. In other words, the first protrusion 35 and the second protrusion 25 are formed in the portions that correspond to the crank portion 421 and the straight portion 422 and that are of the first surface 401 and the second surface 402, respectively. The first protrusion 35 is formed on the first surface 401 that is on the holding portion 30 side and that constitutes the slit hole 40. The second protrusion 25 is formed on a portion of the second surface 402 that faces the first surface 401 where the first protrusion 35 is formed. Note that the first protrusion 35 and the second protrusion 25 need only be formed in portions that correspond to at least the crank portion 421 and that are of the first surface 401 and the second surface 402, respectively.

According to the above configuration, in the portions that are of the first surface 401 and the second surface 402 and that correspond to the crank portion 421, the first protrusion 35 and the second protrusion 25 are formed, respectively. Therefore, when the slit hole 40 is bonded, the first protrusion 35 and the second protrusion 25 can abut on each other in the Z direction. Further, the first protrusion 35 and the second surface 402 can abut on each other in the X direction, and the second protrusion 25 and the first surface 401 can abut on each other in the X direction. Accordingly, when the slit hole 40 is bonded, it is possible to prevent the slit hole 40 from being displaced in the Z direction and in the X direction. Further, the crank portion 421 is curved such that the angle made between the crank portion 421 and the straight portion 41 is an obtuse angle. This allows, as illustrated in FIG. 5, the first protrusion 35 and the second surface 402 to abut on each other in the Y direction and the second protrusion 25 and the first surface 401 to abut on each other in the Y direction. Accordingly, it is possible to prevent the slit hole 40 from being displaced in the Y direction.

Aspects of the present invention can also be expressed as follows:

A weather strip in accordance with Aspect 1 of the present invention is a weather strip to be attached to a vehicle, including: a base portion which is to be attached to an attachment part of the vehicle; and a hollow sealing portion which has a hollow shape and which is integrally formed with the base portion, the base portion being provided with a holding portion that is formed to hold an attaching member for attaching the base portion to the attachment part, and a slit hole that is formed to extend in a longitudinal direction of the base portion, the slit hole being provided with a crank portion that is formed to extend along a short-side direction of the base portion so as to avoid the holding portion, and the holding portion having a thin portion where an insertion hole through which the attaching member is to be inserted is formed, and a thick portion that is formed on at least one of both end sides of the thin portion in the longitudinal direction of the base portion so as to be thicker than the thin portion and so as to extend in the short-side direction of the base portion.

According to the above configuration of Aspect 1, since the thick portion is formed in the holding portion, the rigidity of the holding portion can be increased. Thus, the holding portion less easily bends. This makes it possible to reduce the risk of the occurrence of a bonding failure at the time when the slit hole is bonded.

The weather strip according to Aspect 2 may be configured such that: in the above Aspect 1, the crank portion extends from one end side to the other end side of the base portion in the short-side direction of the base portion; and in the longitudinal direction of the base portion, the thick portion is located between the insertion hole and the crank portion, and extends from the at least one end of the thin portion in a direction away from the insertion hole. According to the above configuration of Aspect 2, the thick portion extends not only in the short-side direction of the base portion but also in the longitudinal direction of the base portion. This can make it difficult for the holding portion to bend. This makes it possible to further reduce the risk of the occurrence of a bonding failure at the time when the slit hole is bonded.

The weather strip according to Aspect 3 may be configured such that: in the above Aspect 2, the thick portion of the base portion has a width in the longitudinal direction that gradually increases from the other end side to the one end side. According to the above configuration of Aspect 3, an area ratio of the thick portion to the holding portion can be increased. Therefore, it is possible to further increase the rigidity of the holding portion. This makes it possible to further reduce the risk of the occurrence of a bonding failure at the time when the slit hole is bonded.

The weather strip according to Aspect 4 may be configured such that: in any one of the above Aspects 1 to 3, in the thickness direction of the base portion, the thick portion is formed on a surface which is on the same side as a surface where the hollow sealing portion of the base portion is formed. According to the above configuration of Aspect 4, no step that is produced due to thickness difference between the thick portion and the thin portion is formed, on the surface of the holding portion which is located opposite to the surface where the hollow sealing portion of the base portion is formed. This makes it possible to easily attach the attaching member to the holding portion.

The weather strip according to Aspect 5 may be configured such that: in any one of the above Aspects 1 to 4, in at least a portion that corresponds to the crank portion and that is of a first surface which is a surface of the base portion where the slit hole is formed and which is located on a side where the holding portion is provided, a first protrusion is formed so as to protrude toward a second surface that faces the first surface; in at least a portion that corresponds to the crank portion and that is of the second surface which is another surface of the base portion where the slit hole is formed, a second protrusion is formed so as to protrude toward the first surface; and in the thickness direction of the base portion, the second protrusion is located closer to a surface where the hollow sealing portion is formed than the first protrusion.

According to the above configuration of Aspect 5, in the portions that are of the first surface and the second surface and that correspond to the crank portion, the first protrusion and the second protrusion are formed, respectively. Therefore, when the slit hole is bonded, the first protrusion and the second protrusion can abut on each other in the thickness direction. Further, the first protrusion and the second surface can abut on each other in the longitudinal direction of the base portion and the second protrusion and the first surface can abut on each other in the longitudinal direction of the base portion. This makes it possible to prevent the slit hole from being displaced at the time when the slit hole is bonded.

[Supplemental Remarks]

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

10 weather strip
20 base portion
25 second protrusion
30 holding portion
31 thin portion
32 thick portion
33 insertion hole
35 first protrusion
40 slit hole
50 hollow sealing portion
60 clip (attaching member)

The invention claimed is:

1. A weather strip to be attached to a vehicle, comprising:
a base portion which is to be attached to an attachment part of the vehicle; and
a hollow sealing portion which has a hollow shape and which is integrally formed with the base portion,
the base portion being provided with a holding portion that is formed to hold an attaching member for attaching the base portion to the attachment part, and a slit hole that is formed to extend in a longitudinal direction of the base portion,
the slit hole being provided with a crank portion that is formed to extend along a short-side direction of the base portion so as to avoid the holding portion, and
the holding portion having a thin portion where an insertion hole through which the attaching member is to be inserted is formed, and a thick portion that is formed on at least one of both end sides of the thin portion in the longitudinal direction of the base portion so as to be thicker than the thin portion and so as to extend in the short-side direction of the base portion;
wherein the crank portion extends from one end side to the other end side of the base portion in the short-side direction of the base portion,
wherein in the longitudinal direction of the base portion, the thick portion is located between the insertion hole and the crank portion, and extends from the at least one end of the thin portion in a direction away from the insertion hole; and
wherein the thick portion of the base portion has a width in the longitudinal direction that gradually increases from the other end side to the one end side.

2. The weather strip according to claim 1, wherein in the thickness direction of the base portion, the thick portion is formed on a surface which is on the same side as a surface where the hollow sealing portion of the base portion is formed.

3. The weather strip according to claim 1, wherein:
in at least a portion that corresponds to the crank portion and that is of a first surface which is a surface of the base portion where the slit hole is formed and which is located on a side where the holding portion is provided, a first protrusion is formed so as to protrude toward a second surface that faces the first surface;
in at least a portion that corresponds to the crank portion and that is of the second surface which is another surface of the base portion where the slit hole is formed, a second protrusion is formed so as to protrude toward the first surface; and in the thickness direction of the base portion, the second protrusion is located closer to a surface where the hollow sealing portion is formed than the first protrusion.

* * * * *